(12) United States Patent
Kwon (10) Patent No.: US 7,287,865 B2
(45) Date of Patent: Oct. 30, 2007

(54) DISPLAY OPTICAL SYSTEM

(75) Inventor: Soon Hyung Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/433,352

(22) Filed: May 15, 2006

(65) Prior Publication Data

US 2006/0203201 A1   Sep. 14, 2006

Related U.S. Application Data

(63) Continuation of application No. 10/786,305, filed on Feb. 26, 2004, now Pat. No. 7,066,607.

(30) Foreign Application Priority Data

Feb. 27, 2003 (KR) ............................ 2003-12292

(51) Int. Cl.
*G03B 21/28* (2006.01)
*G02F 1/00* (2006.01)

(52) U.S. Cl. ................... 353/99; 353/94; 348/771

(58) Field of Classification Search ............. 353/20, 353/28, 30, 33, 37, 69, 81, 97, 102, 94, 98, 353/99, 57; 348/770, 771
See application file for complete search history.

(56) References Cited

U.S. PATENT DOCUMENTS

| 6,129,437 | A  | * | 10/2000 | Koga et al. ............... 353/98 |
| 6,394,608 | B1 | * | 5/2002  | Shiraishi et al. ............ 353/57 |
| 6,471,356 | B1 |   | 10/2002 | Gohman et al. ............ 353/33 |
| 6,527,396 | B2 |   | 3/2003  | Okamori et al. ............ 353/98 |
| 6,558,007 | B2 |   | 5/2003  | Nakagawa et al. .......... 353/98 |
| 6,609,798 | B1 |   | 8/2003  | Millinusic et al. ........... 353/98 |
| 6,799,852 | B2 |   | 10/2004 | Sekiguchi et al. ......... 353/102 |
| 2004/0184012 | A1 | | 9/2004 | Hori ............................ 353/99 |

FOREIGN PATENT DOCUMENTS

JP    2003-222821 A   *   8/2003

* cited by examiner

*Primary Examiner*—Andrew T. Sever
(74) *Attorney, Agent, or Firm*—Ked & Associates, LLP (57) ABSTRACT

A projection type display optical system is provided to resolve problems of keystone distortion, and to improve illumination efficiency and contrast uniformity of an image. The projection type display optical system includes: a light source; DMD as an image display means to which an emitting light ray from the light source is irradiated; and an illumination unit installed in between the light source and the image display means, and comprising: a rod lens operating as an optical device for unifying the brightness distribution of an incident light ray from the light source and emitting the brightness unified light ray; a first lens for transmitting the emitted light ray by the rod lens; a second lens on which the transmitted light ray from the first lens incidents; and a projection part for magnifying and projecting an image formed on the image display means onto a screen, wherein the first and second lenses are set in such a manner that an optical axis of the second lens and an optical axis of the first lens do not coincide with each other, whereby a surface image that is formed when an emitted surface of the rod lens transmits the first and second lens groups is not inclined to the surface of the image display means.

24 Claims, 5 Drawing Sheets

Fig. 6b

DISPLAY OPTICAL SYSTEM

CROSS-REFERENCE TO A RELATED APPLICATION

This application is a Continuation of U.S. application Ser. No. 10/786,305 filed Feb. 26, 2004, now U.S. Pat. No. 7,066,607 which claims priority to Korean Application No. 0012292/2003 filed Feb. 27, 2003, the entire contents of which are hereby incorporated in their entirety.

BACKGROUND OF THE INVENTION

1. Field of the Invention

The present invention relates in general to a display optical system, more particularly, to an illuminating apparatus in a projection-type display optical system based on a DMD.

2. Discussion of the Background Art

As image projection apparatuses also called projectors are widely used in many fields, diverse types of projectors are currently under development or already came into the market. A recent trend in the technologies for image projection apparatuses is to improve brightness and to develop small size/light weight image projection apparatuses.

An optical system of the image projection apparatus includes a lamp being used as a light source, an illumination unit for illuminating a light source from the lamp to an image display device, and a projection unit for enlarging and for projecting images displayed on the image display device onto a screen.

A high-pressure mercury lamp is usually used for the lamp. As for the image display device, liquid crystal display device or DMD (Digital Micromirror Device) is widely used.

The above-cited DMD, having a two-dimensional array of a number of pixels each having a micromirror, controls the tilt of each mirror individually through the effect of electrostatic field caused by a memory element arranged respectively for each pixel and varies the angle of reflection of reflected light ray thereby causing on/off state.

Depending on the number of image display devices used in the projection type display, the optical system is divided into single panel-, 2 panel-, and 3 panel-optical systems. Keeping abreast with the recent trend in small size/light weight and low-price devices, 1-chip image display devices are now used.

There are three methods for the construction of an image projection apparatus with the 1-chip image display device.

First, the display device can include red, green, and blue (R, G, B) color filters. Second, a light can be divided into R, G, and B colors in outside and at the same time, illuminated on a display device. Third, a light can be divided into R, G, and B colors and illuminated at regular intervals.

Out of the above-described methods, the present invention will be based on the third method, i.e. the light is divided into R, G, and B colors and illuminated at regular intervals.

With the application of the third method, response speed of the 1-panel image display device needs to be at least three times faster than that of the 3-panel image display device. Among the current image display devices DMD™ will satisfy this condition.

Figure 1:
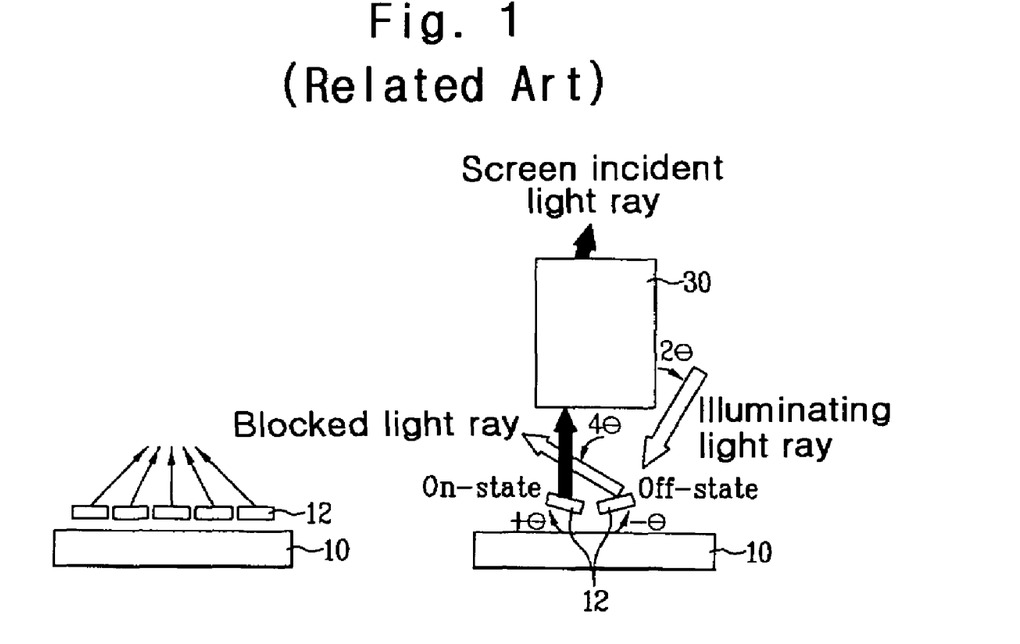
FIG. 1 illustrates a simplified structure of a related art DMD, and optical operation states of the DMD as a display device.

FIG. 1 illustrates a simplified structure of a related art DMD, and optical operation states of the DMD as a display device.

As shown in FIG. 1, DMD 10 is composed of micromirrors 12 (each micromirror represents one pixel), and each of the micromirrors 12 is in ±Θ tilt mode according to an electric signal. The currently commercialized tilt angle of the micromirrors is 10 or 12 degrees.

Although, in reality, the micromirrors 12 tilt in a diagonal axis of square pixels, for convenience of description, an assumption is made that the tilt of the micromirrors 12 is operated with respect to a vertical axis.

Typically, when light rays reflected off the micromirrors 12 are directed to a projection lens 30 and form a magnified image on a screen, the surface of the DMD 10 and the optical axis of the projection lens 30 should be positioned in the vertical direction. In general, in the horizontal direction of the DMD 10 the center of the DMD 10 and the optical axis of the projection lens 30 coincide with each other. In the vertical direction of the DMD 10, on the other hand, an upward projection is applied for the sake of convenience to decenter optical centers. However, in the related art DMD shown in FIG. 1, it is assumed that the optical centers are not decentered.

Referring to FIG. 1, for the micromirrors of the DMD to be an optically on state (white) under the above condition, a chief ray of illuminating rays should incident on the surface of DMD 10 in such a manner that the chief ray can be emitted perpendicular to the surface of DMD 10 especially when the tile angle of the micromirrors 12 of the DMD 10 in the on state is ±Θ. In this case, the incidence angle of the illuminating ray on the DMD surface should be 2Θ.

Under the above-described structural conditions for the DMD type projection optical system, light rays in the off state are emitted at a 4Θ tilt angle with respect to the optical axis of the projection lens 30. Thus, the light rays cannot transmit the projection lens 30, and thus cannot project light on the screen, resulting in a black screen.

Figure 2A:
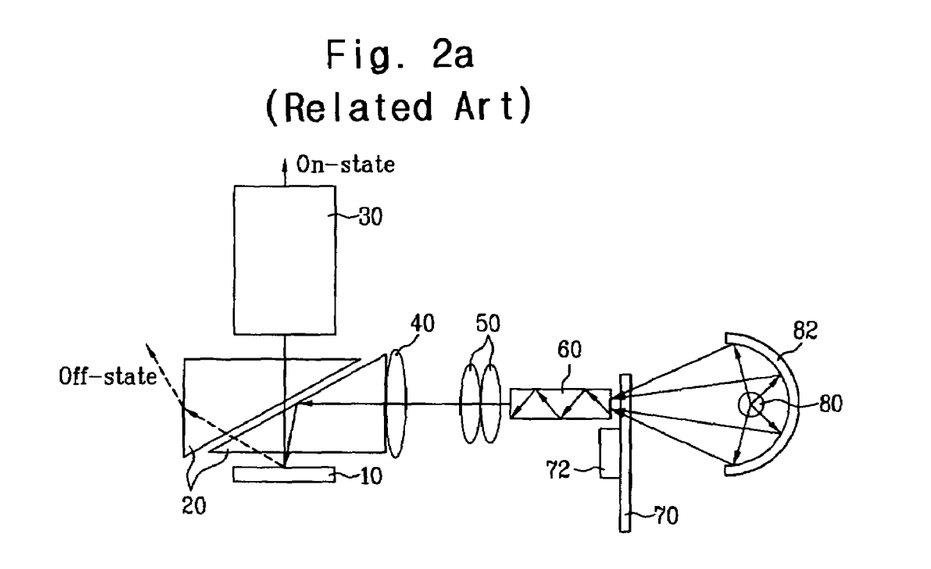
FIG. 2a is a plane view of one embodiment of a related art projection optical system based on a single-chip DMD.
Figure 2B:
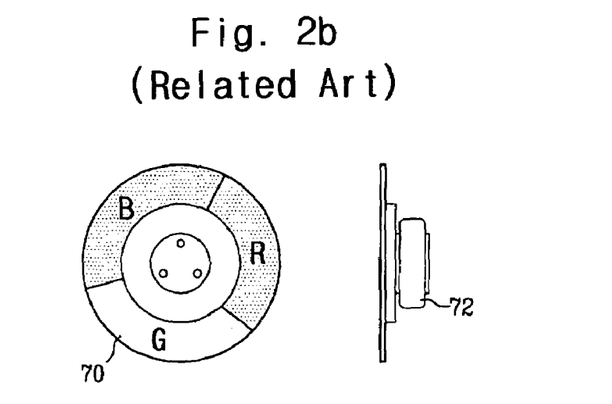
FIG. 2b is a plane view and a side view of a color wheel in a general color filter in a time-sharing system.

FIG. 2a is a plane view of one embodiment of a related art projection optical system based on a single-chip DMD, and FIG. 2b is a plane view and a side view of a color wheel in a general color filter in a time-sharing system.

As depicted in FIG. 2a, as for a light source a lamp 80 having an ellipsoidal reflective mirror 82 attached thereto is used, and light rays from the light source are focused on an incident surface of a rod lens 60.

Arranged between the lamp 80 and the rod lens 60 is a color wheel 70 for separating the light into R, G, and B colors in sequence.

The color wheel 70, as shown in FIG. 2b, is attached to a rotatory motor 72 like a disk, and sequentially filters R, G, and B colors of light rays as the motor rotates.

Because an area with a least color filtering is where the light rays from the lamp 80 are focused on the incident surface of the rod lens 60, the color wheel 70 is positioned before the incident surface of the rod lens 60.

Therefore, when a light ray having been filtered to a specific color through the color wheel 70 incidents on the rod lens 60, the light ray goes through several times of reflection inside of the rod lens 60, and transmits the rod lens 60. Then, the transmitted light ray is scattered over the entire emitting surface.

In other words, the light ray from the light source is progressed or decentered to the emitting surface of the rod lens 60, and as a result thereof, the emitting surface becomes a surface light source having a secondary uniform contrast distribution.

The emitted light from the rod lens 60 is transmitted through a first and second illuminating lens groups 50 and 40 and a TIR (Total Internal Reflection) prism 20, and forms a proper-size image of the emitting surface of the rod lens 60 on the image display device, namely the DMD surface. In this manner, the DMD surface obtains uniform contrast distribution.

Referring back to FIG. 2*a*, the TIR prism 20 is formed by setting two prisms apart with a slight air gap in between. Thus, an incident light is totally reflected off the first prism surface, and incidents on the DMD 10. The DMD 10 then emits the incident light at a different emission angle from the incident light by the tilt pixel micromirrors in on state (white), whereby the light does not experience total internal reflection but is transmitted to the outside again.

Thusly emitted light transmits the projection lens 30 and forms a magnified image on the screen.

In consideration with the total internal reflection from the first boundary surface of the illuminating ray and the operational characteristics of the TIR prism 20 for transmitting a white ray from the DMD 10 through the secondary boundary surface, it becomes important to maintain the telecentric characteristic of the illuminating ray.

However, the related art projection type optical system illustrated in FIG. 2*a* has several shortcomings. For instance, variable reflectivity and transmittance in dependence of the beam angle of the illuminating ray deteriorates light transmission efficiency, and an increased diameter of the projection lens 30 due to telecentric characteristic of the illuminating ray consequently increases cost of manufacture. Besides, the micromirrors of the DMD 10 are put in zero state, noises are generated by diffraction, and contrast is also degraded as light transmission is increased.

Figure 3:
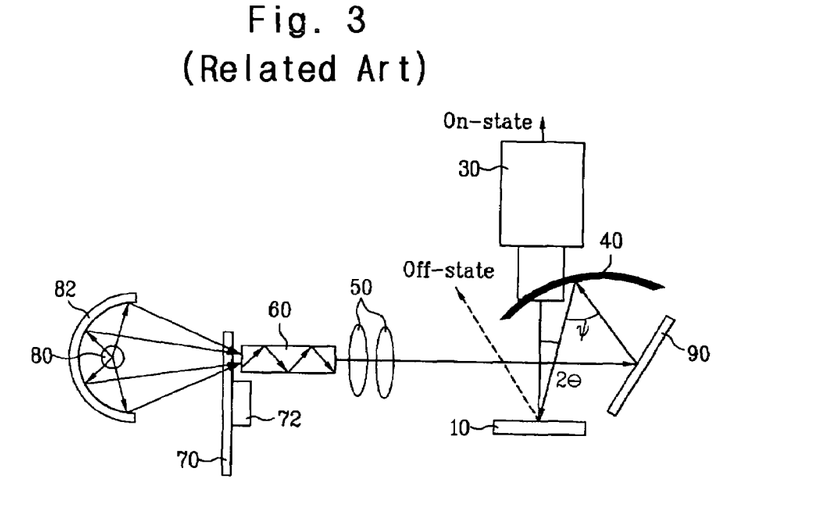
FIG. 3 illustrates another embodiment of a related art projection type optical system using a single-chip DMD.

FIG. 3 illustrates another embodiment of a related art projection type optical system using a single-chip DMD.

Particularly, FIG. 3 illustrates an image projection apparatus without the TIR prism 20, to overcome the shortcomings found in the projection type optical system of FIG. 2.

As for the image projection apparatus without the TIR prism 20, the secondary illuminating lens group 40 can be utilized either in a glass type or in a mirror type. Since optical principles are basically same, it will be more necessary to discuss the structure of a reflective mirror lens.

Same operational principles of the projection optical system shown in FIG. 2 are also applied to the projection optical system of FIG. 3, more specifically, until the rod-shape tube rod lens 60 out of the system. Also, the illuminating lens 80 ensures that a chief ray of the illuminating rays emitted from the rod lens 60 incidents at an angle of 2Θ upon the DMD surface.

However, the projection optical system of FIG. 3 differs from the projection optical system of FIG. 2 in that a total reflection mirror 90 for changing a light path is installed in between the first illuminating lens group 50 and the second illuminating lens group 40. As a result, the light path of the first illuminating lens group 50 and the light path between the second illuminating lens group 40 and the DMD 10 are overlapped, and the entire optical system becomes more compact.

In addition, the optical system shown in FIG. 3 is no longer subject to telecentric limitation of illuminating rays by not including TIR prim 20. Accordingly, when incidenting on the surface of the DMD 10, chief rays at each objective space on the emitting surface of the rod lens 60 do not have to maintain the telecentric relation with other rays, but can be converged on the DMD surface.

In a practical sense, the converging illumination design is necessary to reduce the size of the incident surface of the projection lens 30 so that optical interference is not caused by the overlapped projection lens 30 and the mirror type lens (the second illuminating lens group) 40.

The optical system without the TIR prism 20, compared to the optical system with the TIR prism 20, is smaller, less costly, and has an improved contrast and brightness uniformity.

When the mirror type lens is used as the second illuminating lens group 40, however, the rod lens 60, the optical axis of the first illuminating lens group 50, and the optical axis of the second mirror type lens 40 may be coincident. In that situation, a reflected ray from the mirror type lens 40 travels back to the optical axis direction of the first illuminating lens group 50, which consequently causes the optical interference.

Figure 4A:
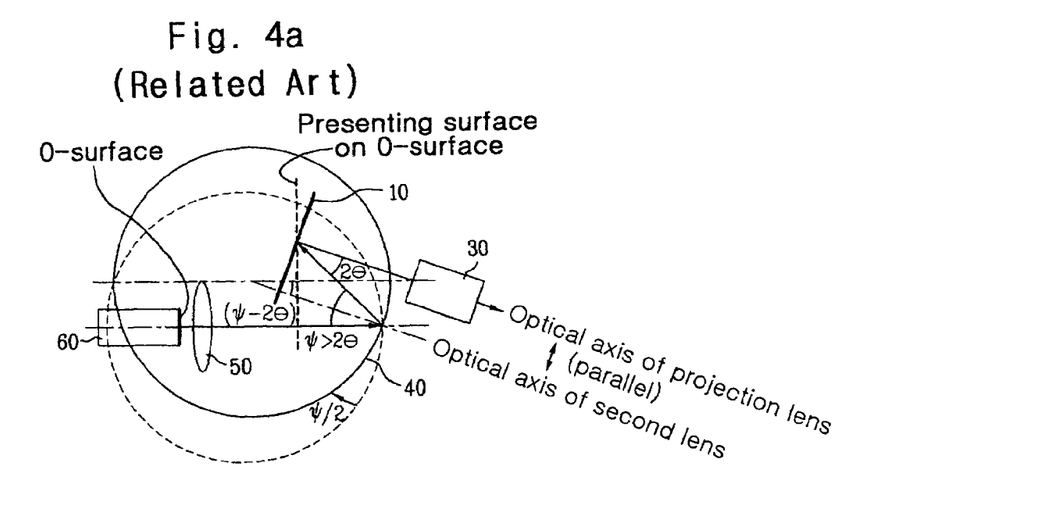
FIGS. 4a and 4b diagrammatically illustrate operation principles of illumination of a related art single-chip DMD projection type optical system, and illumination on an image having keystone distortion.

To obviate the above described problem, another embodiment of a related art projection type optical system shown in FIG. 4*a* introduces an idea of twisting the optical direction of a reflected light at Ψ degree angles, by rotating the mirror type lens 40 in Ψ/2 degrees with respect to an intersection between the mirror type lens 40 and the optical axis of the rod lens 60.

Figure 4B:
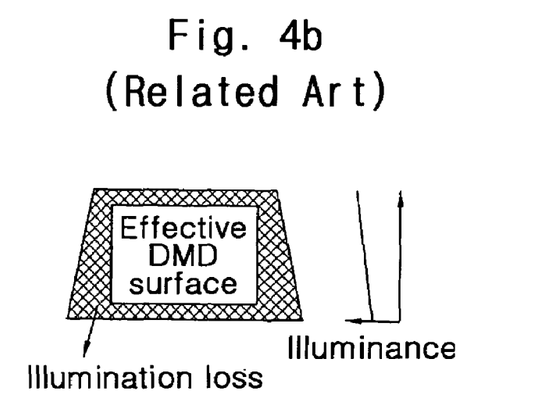

Here, the illuminating image-based surface on the emitting surface of the rod lens 60 is actually tilted at a certain degree angles from the DMD surface. Therefore, the illuminating image on the DMD surface 10 takes on a distracting keystone shape, as shown in FIG. 4.

Keystone distortion is caused when the illumination area and the actually effective DMD surface are not at one angle (i.e. The projected image looks like a trapezoid although it should be a rectangle). In this case, a loss in light rays is inevitable.

Also, keystone distortion problems differentiate illuminance according to the DMD 10 positions, and this resultantly deteriorates brightness uniformity on the screen.

This keystone distortion also exists in the optical system with the TIR prism 20 shown in FIG. 2*a* because the first illuminating lens axis is not perpendicular to the DMD surface axis and because an illuminating ray has an incidence angle of 2Θ on the DMD surface.

SUMMARY OF THE INVENTION

An object of the invention is to solve at least the above problems and/or disadvantages and to provide at least the advantages described hereinafter.

Accordingly, one object of the present invention is to solve the foregoing problems by providing a projection type optical system with improved brightness uniformity and illumination efficiency, by minimizing problems of keystone distortion.

The foregoing and other objects and advantages are realized by providing a projection type display optical system, which includes: a light source; DMD as an image display means which receives a light beam emitting from the light source; and an illumination unit installed in between the light source and the image display means, and comprising: a rod lens operating as an optical device for unifying the brightness distribution of an incident light ray from the light source and emitting the brightness unified light ray; a first lens for transmitting the emitted light ray by the rod lens; a second lens on which the transmitted light ray from the first lens incidents; and a projection part for magnifying and projecting an image formed on the image display means onto a screen, wherein the first and second lenses are set in such a manner that an optical axis of the second lens and an optical axis of the first lens do not coincide with each other, whereby a surface image that is formed when an emitted surface of the rod lens transmits the first and second lens groups is not inclined to the surface of the image display means.

In an exemplary embodiment of the invention, the second lens is decentered with respect to the optical axis of the first lens, whereby the surface image that is formed when the emitted surface of the rod lens transmits the first and second lens groups is not inclined to the surface of the image display means, and the optical axis of the second lens does not coincide with the optical axis of the first lens In an exemplary embodiment of the invention, the optical axis of the second lens is in parallel with a light path of the optical axis of the first lens In an exemplary embodiment of the invention, the optical axis of the first lens coincides with a central axis of the rod lens.

In an exemplary embodiment of the invention, the optical axis of the first lens and the optical axis of the second lens are parallel to each other In an exemplary embodiment of the invention, if a light lay to the optical axis of the first lens is incident on the second lens and emitted by the second lens, an angle between the emitted light ray from the second lens and the optical axis of the first lens is equal to an angle between an emitted light ray from the image display means in on state and the emitted light ray from the second lens In an exemplary embodiment of the invention, the second lens is a mirror type lens In an exemplary embodiment of the invention, wherein a reflection mirror for changing the light path of a light ray is installed in between the first lens and the second lens In an exemplary embodiment of the invention, wherein the second lens has an aspheric surface Therefore, the projection type display optical system of the present invention can be advantageously used for resolving problems of keystone distortion and for improving illumination efficiency and contrast uniformity.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a projection type optical system according to a preferred embodiment of the invention in reference to the accompanying drawings.

Figure 5:
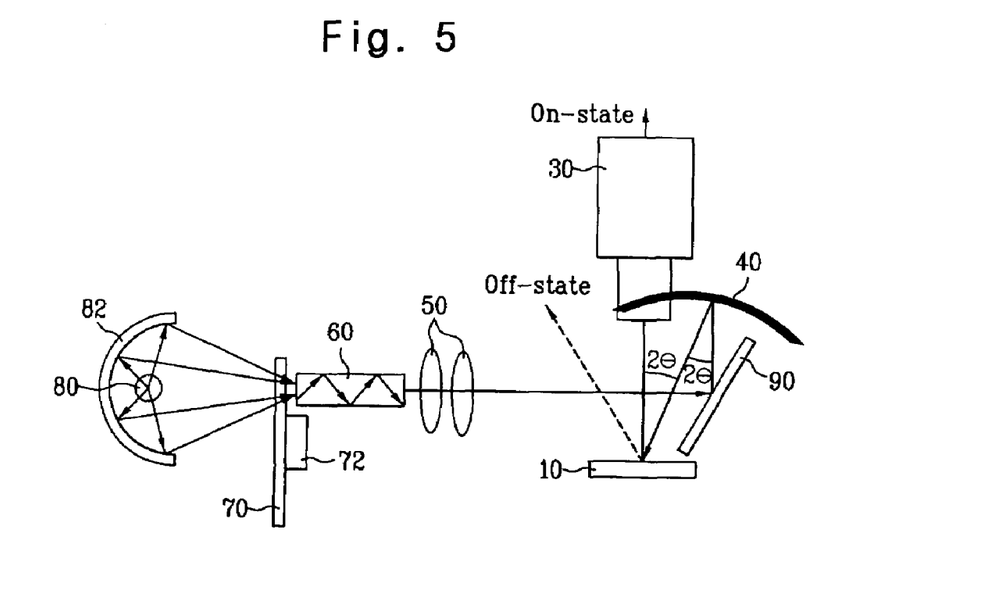
FIG. 5 illustrates a projection type optical system using a single-chip DMD according to a preferred embodiment of the present invention.

FIG. 5 illustrates a projection type optical system using a single-chip DMD according to a preferred embodiment of the present invention.

The projection type optical system of the present invention differs from the related art projection type optical system in that a second illuminating lens group 40 of the invention, which is capable of improving illumination efficiency and brightness uniformity, is disposed at a different position.

Referring to FIG. 5, a lamp 80 having an ellipsoidal reflective mirror 82 attached thereto is used as a light source, and light rays from the light source are focused on an incident surface of a rod lens 60.

A color wheel 70 for separating the light into R, G, and B colors in sequence is arranged between the lamp 80 and the rod lens 60.

The color wheel 70, as shown in FIG. 2b, is attached to a rotatory motor 72 like a disk, and sequentially filters R, G, and B colors of light rays as the motor rotates.

Because an area with a least color filtering is where the light rays from the lamp 80 are focused on the incident surface of the rod lens 60, the color wheel 70 is positioned before the incident surface of the rod lens 60.

Therefore, when a light ray having been filtered to a specific color through the color wheel 70 incidents on the rod lens 60, the light ray goes through several times of reflection inside of the rod lens 60, and transmits the rod lens 60. Then, the transmitted light ray is scattered over the entire emitting surface.

In other words, the light ray from the light source is progressed or decentered to the emitting surface of the rod lens 60, and as a result thereof, the emitting surface becomes a surface light source having a secondary uniform contrast distribution.

Basically there are two type of rod lens 60. First, the rod lens 60 can be a hollow lens whose inner surface is covered with a mirror so that it can perform mirror reflection. Second, the rod lens 60 can be a glass having a high index of refraction so that it can perform total internal reflection.

The emitted light from the rod lens 60 is transmitted through a first and second illuminating lens groups 50 and 40, and forms a proper-size image of the emitting surface of the rod lens 60 on the image display device, namely the DMD surface. In this manner, the DMD surface obtains uniform contrast distribution.

Meanwhile, a total reflection mirror 90 for changing a light path is installed in between the first illuminating lens group 50 and the second illuminating lens group 40. As a result, the path of the emitted light from the rod lens 60 and the light path between the second illuminating lens group 40 and the DMD 10 are overlapped spatially, and the entire optical system becomes more compact.

In a practical sense, the converging illumination design is necessary to reduce the size of the incident surface of the projection lens 30 so that optical interference is not caused by the overlapped projection lens 30 and the mirror type lens (the second illuminating lens group) 40.

The above-describe projection type optical system of the present invention, compared to the related art optical system with the TIR prism (20 in FIG. 2), is smaller, less costly, and has an improved contrast and brightness uniformity.

When the mirror type lens is used as the second illuminating lens group 40, however, the rod lens 60, the optical axis of the first illuminating lens group 50, and the optical axis of the second mirror type lens 40 can be coincident. In that situation, a reflected ray from the mirror type lens 40 travels back to the optical axis direction of the first illuminating lens group 50, which consequently causes the optical interference.

Figure 6A:
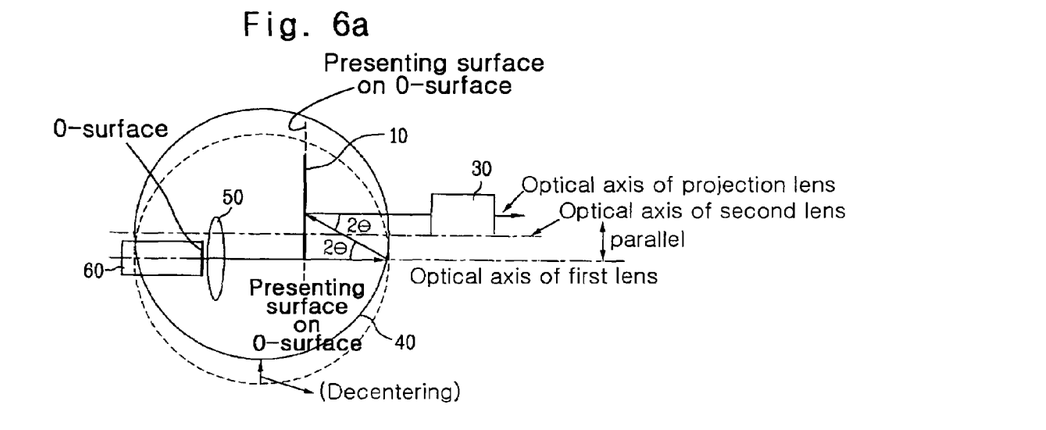
FIGS. 6a and 6b diagrammatically illustrate operation principles of illumination of a related art single-chip DMD projection type optical system, and illumination on a rectified image through keystone correction.

As a solution for the above described problem, another embodiment of the present invention shown in FIG. 6a shows that with respect of an intersection between the reflective lens 40 and the optical axis of the rod lens 60, the central axis of the second illuminating lens group 40 should be decentered, and the optical axis of the first illuminating lens group 50 should be coincident with the optical axis of the rod lens 60.

Here, the reflective lens 40 can have an aspheric surface.

Therefore, the optical axis of the second illuminating lens group 40 is not optically parallel to the optical axis of the first illuminating lens group 50.

Although it is the central axis of the second lens group 40 that has been decentered in the embodiment in FIG. 6a, the optical axis of the second illuminating lens group 40 can also be decentered.

To be more specific, the optical axis of the rod lens 60 and the optical axis of the first illuminating lens group 50 coincide with each other, and the optical axis of the second illuminating lens group 40 is in parallel with the optical axis being coincided.

Moreover, the angle (i.e. 2Θ) between the emitted light ray from the second illuminating lens group 40 and the optical axis of the first illuminating lens group 50 is equal to the angle (i.e. 2Θ) between the emitted light ray from the DMD 10 in on state and the emitted light ray from the second illuminating lens group 40.

To be short, the optical axis of the first illuminating lens group 50 is in parallel with the optical axis of the projection lens 30.

Figure 6B:
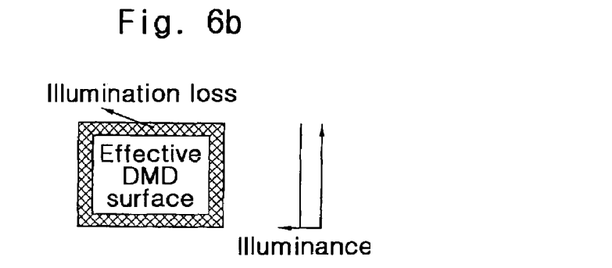

With the above constitution, the emitting surface of the rod lens 60 coincides with the DMD surface, and thus, as shown in FIG. 6b an illuminating image is formed in the vicinity of the effective surface of the DMD 10. In consequence, illuminating loss is reduced and contrast distribution over the screen (also on the emitting surface of the rod lens 60) is uniform.

The relation of object/image between the emitting surface of the rod lens 60 and the surface of DMD 10 can be explained by the facts that a first image formed on the emitting surface of the rod lens 60 by the first illuminating lens group 50 is perpendicular to the optical axis of the rod lens 60, and using the first image as a second object, an image is formed on the DMD surface by the second illuminating lens group 40 that is perpendicular to the image.

Thusly emitted light ray transmits the projection lens 30, and forms an image on the screen.

In conclusion, according to the display optical system of the present invention, the surface image that is formed when an emitted surface of the rod lens transmits the first and second lens groups is not inclined to the surface of the image display means. Also, the second illuminating lens group is decentered with respect of the optical axis of the first illuminating lens group so that the optical axis of the second illuminating lens group does not coincide with the light path of the optical axis of the first illuminating lens group. In this manner, problems of keystone distortion are resolved, and illumination efficiency and contrast uniformity are much improved.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A display optical system comprising:
   a light source;
   an image display means which receives a light beam emitted from the light source;
   an illumination unit installed in between the light source and the image display means, the illumination unit comprising:
     an optical device which outputs the light beam inputted from the light source,
     a first lens for transmitting the emitted light ray from the optical device and a second lens on which the transmitted light ray from the first lens incidents;
     a reflection mirror for changing a light path of a light ray, the reflection mirror provided in between the first lens and the second lens; and
   a projection part for projecting an image formed on the image display means onto a screen,
   wherein an optical axis of the first lens, the second lens and a projection lens of the projection part are all in parallel, and wherein if a light ray to the optical axis of the first lens is incident on the second lens and emitted by the second lens, an angle between the emitted light ray from the second lens and the optical axis of the first lens is equal to an angle between an emitted light ray from the image display means in an on state and the emitted light ray from the second lens.

2. The display optical system according to claim 1, wherein the image display means comprises a Digital Mirror Device (DMD).

3. The display optical system according to claim 1, wherein the optical device comprises a rod lens that unifies a brightness distribution of an incident light ray from the light source and emits a unified brightness light ray.

4. The display optical system according to claim 3, wherein a central axis of the second lens is decentered by being translated substantially perpendicularly with respect of an intersection between the second lens and the optical axis of the rod lens.

5. The display optical system according to claim 4, wherein a central axis of the second lens is decentered upward with respect of an intersection between the optical axis of the second lens and the optical axis of the rod lens, and the optical axis of the first lens is coincident with the optical axis of the rod lens.

6. The display optical system according to claim 5, wherein the optical axis of the first lens coincides with a central axis of the rod lens.

7. The display optical system according to claim 1, wherein the optical axis of the second lens does not coincide with the optical axis of the first lens, whereby a surface image that is formed when the emitted light ray from the optical device is transmitted through the first lens and the second lens is not inclined to a surface of the image display means.

8. The display optical system according to claim 1, wherein the first lens and the second lens are set in such a manner than the optical axis of the second lens and the optical axis of the first lens are parallel but do not coincide with each other, whereby a surface image that is formed when the emitted light ray from the optical device is transmitted through the first lens and the second lens is not inclined to a surface of the image display means.

9. The display optical system according to claim 1, wherein the second lens comprises a reflection type lens.

10. The display optical system according to claim 9, wherein the second lens has an aspheric surface.

11. The display optical system according to claim 1, wherein the second lens is decentered with respect to the optical axis of the first lens.

12. A display optical system comprising:
a light source;
an image display device to receive a light beam from the light source; and
an illumination unit including:
a rod lens to output the light beam from the light source,
a first lens to transmit the light beam from the rod lens,
a second lens that receives the transmitted light beam from the first lens,
a reflection mirror to change a light path between the first lens and the second lens, and
a projection part including a projection lens to project an image from the image display means onto a screen,
wherein the first lens, the second lens and the projection lens are set such that an optical axis of each of the first lens, an optical axis of the second lens and an optical axis of the projection lens are parallel to each other, and wherein if a light beam to the optical axis of the first lens is incident on the second lens and is emitted by the second lens, an angle between the emitted light beam from the second lens and the optical axis of the first lens is equal to an angle between an emitted light beam from the image display device in an on state and the emitted light beam from the second lens.

13. The display optical system according to claim 12, wherein the image display device comprises a Digital Mirror Device (DMD).

14. The display optical system according to claim 12, wherein a central axis of the second lens is decentered by being translated substantially perpendicularly with respect to the optical axis of the second lens and an optical axis of the rod lens.

15. The display optical system according to claim 12, wherein a central axis of the second lens is decentered upward with respect to the optical axis of the second lens and an optical axis of the rod lens, and the optical axis of the first lens is coincident with the optical axis of the rod lens.

16. The display optical system according to claim 12, wherein the optical axis of the first lens coincides with a central axis of the rod lens.

17. The display optical system according to claim 12, wherein the first lens and the second lens are set in such a manner than the optical axis of the second lens and the optical axis of the first lens do not coincide with each other.

18. The display optical system according to claim 17, wherein a surface image that is formed when the light beam output from the rod lens is transmitted through the first lens and the second lens is not inclined to a surface of the image display device.

19. The display optical system according to claim 12, wherein the second lens has an aspheric surface.

20. A display optical system comprising:
a light source to output a light beam;
a digital mirror device (DMD) to receive the light beam;
an optical device to receive the light beam from the light source;
a first lens device to receive the light beam from the optical device;
a second lens device to receive the light beam;
a reflection mirror to change an optical axis of the light beam from the first lens device to the second lens device; and
a projection lens to project an image from the digital mirror device onto a screen,
wherein the first lens device, the second lens device and the projection lens are set such that an optical axis of the first lens device, an optical axis of the second lens device and an optical axis of the projection lens are all parallel, and wherein if a light beam to the optical axis of the first lens device is incident on the second lens device and emitted by the second lens device, an angle between the emitted light beam from the second lens device and the optical axis of the first lens device is equal to an angle between an emitted light beam from the digital mirror device in an on state and the emitted light beam from the second lens device.

21. The display optical system according to claim 20, wherein a central axis of the second lens device is decentered by being translated substantially perpendicularly with respect to the optical axis of the second lens device and an optical axis of the optical device.

22. The display optical system according to claim 20, wherein a central axis of the second lens device is decentered upward with respect to the optical axis of the second lens device and an optical axis of the optical device, and the optical axis of the first lens device is coincident with the optical axis of the optical device.

23. The display optical system according to claim 20, wherein the first lens device and the second lens device are set in such a manner than the optical axis of the second lens device and the optical axis of the first lens device do not coincide with each other.

24. The display optical system according to claim 20, wherein a surface image that is formed when the emitted light beam from the optical device is transmitted through the first lens device and the second lens device is not inclined to a surface of the image display device.

* * * * *